United States Patent Office 2,842,943
Patented July 15, 1958

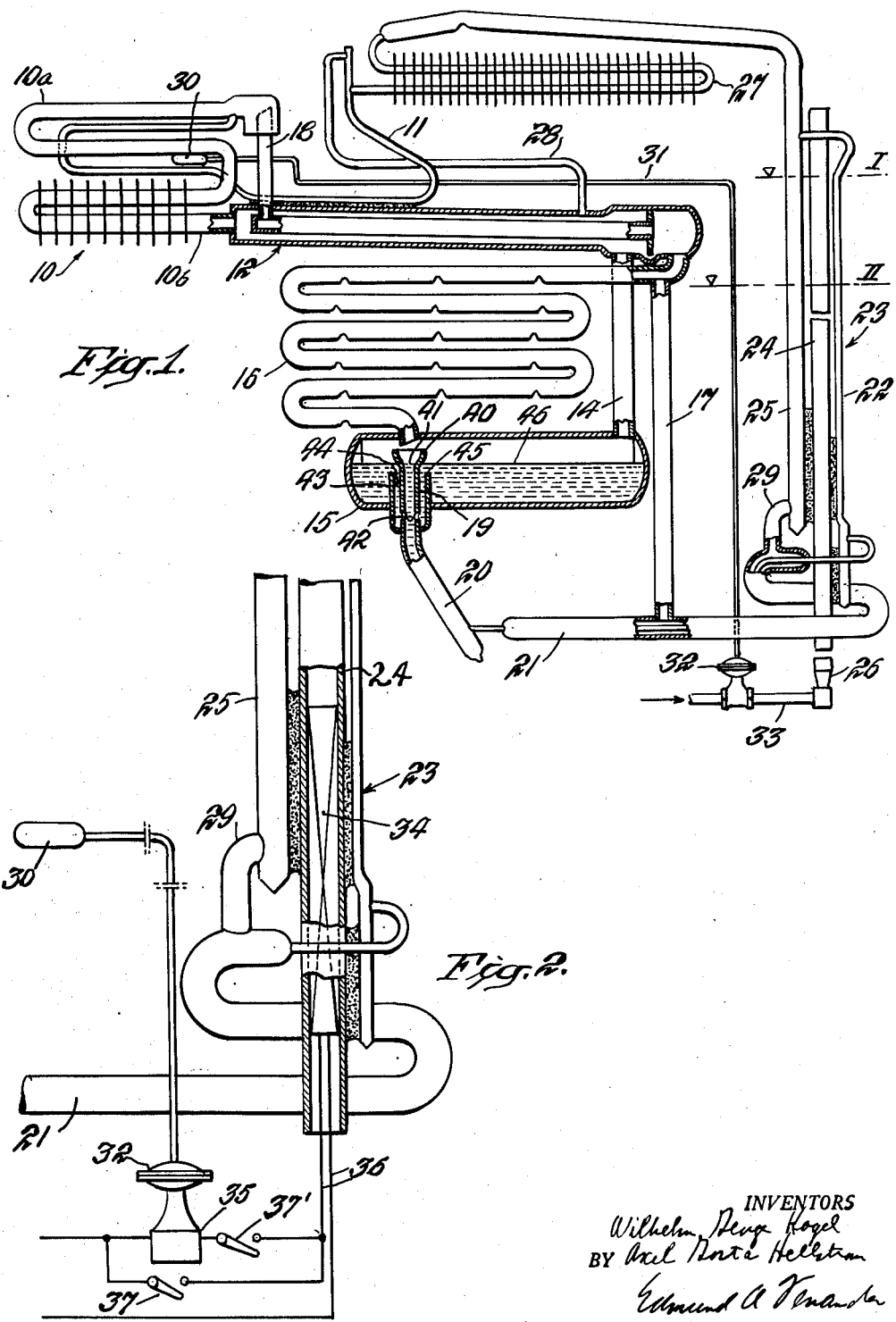

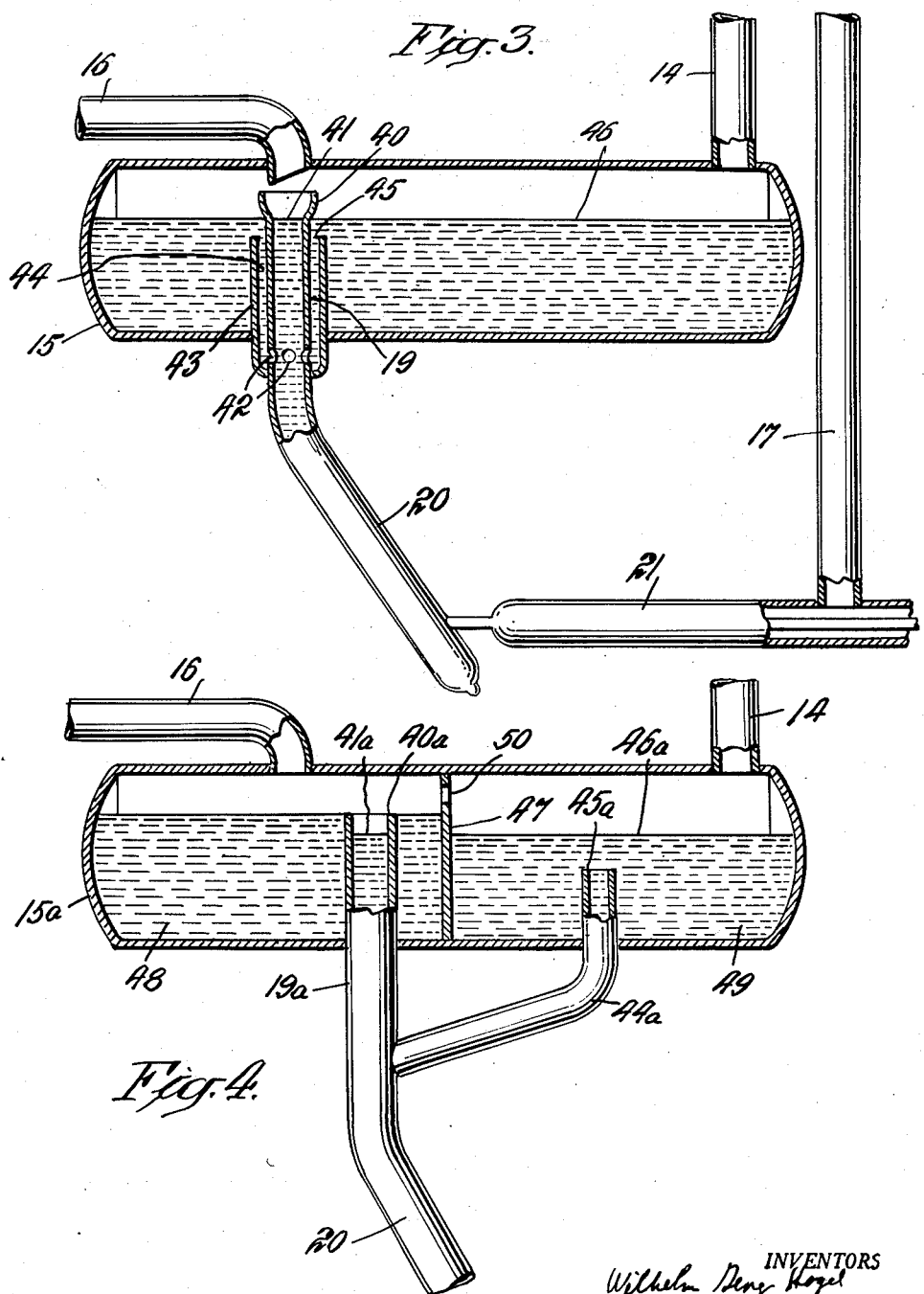

2,842,943

ABSORPTION REFRIGERATION

Wilhelm Georg Kogel, Stockholm, and Axel Gosta Hellstrom, Johanneshov, Sweden, assignors to Aktiebolaget Elektrolux, Stockholm, Sweden, a corporation of Sweden Application March 22, 1955, Serial No. 496,022

Claims priority, application Sweden March 24, 1954

13 Claims. (Cl. 62—110)

Our invention relates to absorption refrigeration, and more particularly to such a refrigeration system employing an auxiliary pressure equalizing gas.

It has been proposed in refrigeration systems of this kind to adjust the concentration of refrigerant in the absorption liquid circuit by accumulating liquid refrigerant with variations in operating conditions, and subsequently redistributing absorption liquid in the absorption liquid circuit to cause such accumulated refrigerant to be introduced in a positive and controlled manner into the absorption liquid circuit. Such redistribution of absorption liquid in its circuit may be effected by making use of absorption liquid available in certain parts of the absorption liquid circuit when normal circulation of absorption liquid is terminated or substantially reduced.

The object of our invention is to provide an improvement for adjusting the concentration of refrigerant in the absorption liquid circuit, which is less sensitive to changes in liquid level and the manner in which the refrigeration system is initially charged with working fluids, especially the quantity of absorption liquid introduced into the system.

Another object is to provide an improvement of this kind in which absorption liquid is redistributed in the absorption liquid circuit in such manner that accumulated liquid refrigerant may be effectively introduced into the absorption liquid circuit in an absorption solution having a relatively high concentration of refrigerant.

A further object is to provide an improved arrangement of this kind for adjusting the concentration of refrigerant in the absorption liquid circuit, which is of simplified construction.

We accomplish this by accumulating liquid refrigerant in a concentration vessel and flowing to such vessel a quantity of absorption liquid nearly equal to and essentially the same as that redistributed in the absorption liquid circuit when such redistribution is effected. Such absorption liquid flows to the concentration vessel through a free liquid communication from an active part of the absorption liquid circuit in which is maintained a body of absorption liquid having a free liquid surface. When redistribution of absorption liquid is effected in its circuit, and such redistributed liquid is transferred to the aforementioned active part, flow of absorption liquid into the concentration vessel immediately takes place.

For this reason, the quantity of absorption liquid in the active circulation circuit of the absorption liquid desirably is only sufficient to maintain liquid circulation, and the size of the liquid passage formed by the aforementioned active part, from which absorption liquid flows to the concentration vessel when redistribution of absorption liquid takes place, is essentially the same as the sizes of the absorption liquid passages through which absorption liquid flows to and from such active part. Redistribution of absorption liquid in its circuit may be effected responsive to interruption of normal circulation of the absorption liquid. When normal circulation of absorption liquid is resumed, absorption liquid relatively rich in refrigerant is withdrawn from the concentration vessel and constitutes the liquid initially supplied to the pump provided in the absorption liquid circuit to effect circulation of liquid therein.

The above and other objects and advantages of the invention will become apparent as the following description proceeds, and the features of novelty which characterize our invention will be pointed out with particularity in the claims annexed to and forming a part of this specification.

For a better understanding of our invention, reference may be had to the following description taken in connection with the accompanying drawings, in which:

Fig. 1 illustrates more or less diagrammatically an absorption refrigeration system of the inert gas type embodying the invention;

Fig. 2 is a fragmentary view of a refrigeration system like that shown in Fig. 1, diagrammatically illustrating another manner of heating the system;

Fig. 3 is an enlarged fragmentary view of parts shown in Fig. 1; and

Fig. 4 is an enlarged fragmentary view similar to Fig. 3, illustrating another embodiment of the invention.

Referring to Fig. 1, we have shown our invention in connection with an air cooled absorption refrigeration system of a uniform pressure type in which an auxiliary pressure equalizing gas is employed. Systems of this type are well known, and include a cooling unit or evaporator structure 10 which is arranged to abstract heat from the thermally insulated interior of a refrigerator cabinet. Refrigerant fluid, such as ammonia, passes through a conduit 11 into the cooling unit 10 and evaporates and diffuses therein into an inert gas, such as hydrogen, to produce a refrigerating effect. The resulting gas mixture of refrigerant and inert gas flows from cooling unit 10 through gas heat exchanger 12, vertically extending conduit 14 and vessel 15 into an air cooled absorber in the form of a looped coil 16.

In the absorber 16 refrigerant vapor is absorbed by a suitable absorbent, such as water, for example, which is introduced into coil 16 through a conduit 17. The hydrogen or inert gas, which is practically insoluble and weak in refrigerant, is returned to cooling unit 10 through gas heat exchanger 12 and a conduit 18. During operation of the refrigeration system, heat is liberated in the absorber 16 due to absorption of refrigerant vapor into absorption liquid. Such heat of absorption is given up to surrounding cool air which passes over the surfaces of the absorber 16, its temperature being determined by the temperature of the cool air flowing in thermal contact therewith.

The circulation of gas in the gas circuit just described is due to the difference in specific weight of the columns of gas rich and weak, respectively, in refrigerant vapor. Since the column of gas rich in refrigerant vapor and flowing from cooling unit 10 to the absorber 16 is heavier than the gas weak in refrigerant vapor and flowing from such coil to the cooling unit 10, a force is produced or developed within the system for causing circulation of inert gas in the manner described.

From conduit section 19, which is disposed within the vessel 15, enriched absorption liquid, which is also referred to as absorption solution, is conducted through a conduit 20 and liquid heat exchanger 21 into a vapor lift pump 22 of a generator or vapor expulsion unit 23. The generator 23 comprises a heating tube 24 having a vapor lift pump 22 and a boiler pipe 25 in thermal exchange relation therewith. By heating generator 23, as by a fluid fuel burner 26, for example, liquid from the liquid heat exchanger 21 is raised by vapor lift action through pump 22 into the upper part of boiler pipe 25. The liberated refrigerant vapor entering boiler pipe 25 through the pump 22, and also vapor expelled from solution in the boiler pipe, flows upwardly into an air cooled condenser 27 in the form of a coil having fins fixed thereto.

Refrigerant vapor is liquefied in the condenser 27 by surrounding cooling air which flows over the surfaces of the coil and fins, and the liquefied refrigerant is returned to the cooling unit 10 through the conduit 11 to complete the refrigerating cycle. Liquid refrigerant flows by gravity in the cooling unit 10, the refrigerant flowing in parallel flow with the inert gas in a low temperature section 10a and then in a higher temperature section 10b of the cooling unit. The lower end of condenser 27 is connected by a conduit 28 to the gas circuit, as to the gas heat exchanger 12, for example, so that any non-condensable gas that may pass into the condenser will flow to the gas circuit and not be trapped in the condenser. The weakened absorption solution, from which refrigerant has been expelled, is conducted from boiler pipe 25 through a conduit 29, liquid heat exchanger 21 and conduit 17 into the upper part of the absorber 16. Circulation of absorption solution in the manner just described is due to raising of liquid from a low level to a higher level I in boiler pipe 25. Absorption liquid flows downwardly by gravity from level I in generator 23 and overflows from the upper end of conduit 17 into the upper end of the absorber coil 16 at the level II. The quantity of liquid held in boiler pipe 25 between the levels I and II defines the static pressure head required to overcome the resistance offered to flow of liquid from the boiler pipe to the upper end of the absorber coil 16.

The refrigeration system just described may be controlled by a thermal bulb 30 which is affected by a temperature condition of cooling unit 10. As shown, the thermal bulb 30 is arranged in thermal exchange relation with the low temperature section 10a of cooling unit 10 and connected by a conduit 31 to a control device 32 which is connected in a fuel supply conduit 33 of burner 26. The thermal bulb 30 and conduit 31 may form part of an expansible fluid thermostat which is charged with a suitable volatile fluid and responds to changes in temperature of cooling unit 10 to operate control device 32 in a manner well known in the art.

When the temperature of cooling unit 10 increases due, for instance, to increase in heat load caused by placing of warm material in the thermally insulated interior of the refrigerator, or to rise in room air temperature, the thermal bulb 30 in normal operation of the refrigeration system becomes effective to operate control device 32 to increase the supply of fuel to burner 26. This increases the heat input and hence the rate at which refrigerant vapor is expelled from solution in generator 23, thereby increasing the amount of refrigerant vapor which condenses in condenser 27 and flows into cooling unit 10. Conversely, when the temperature of cooling unit 10 decreases, the thermal bulb 30 becomes effective to operate control device 32 to decrease the supply of fuel to burner 26. This reduces the heat input and hence the rate at which refrigerant vapor is expelled from solution in generator 23, thereby decreasing the amount of refrigerant vapor which condenses in condenser 27 and flows into cooling unit 10.

The thermostatic control just described is of the kind in which the supply of fuel desirably is reduced to such an extent that substantially no vapor is expelled from solution in generator 23 when the cooling unit 10 reaches a predetermined low temperature. In other words, under these conditions only a sufficient quantity of fuel is supplied to the burner 26 to maintain the latter ignited, and only heat of liquid is supplied to the solution in generator 23 at such times. When the fuel supply to burner 26 is inadequate for the burner to supply heat of vaporization to the solution in the generator, no expulsion of refrigerant vapor from solution will take place and the solution will be maintained below its boiling temperature. Since no expulsion of vapor from solution will take place in generator 23 when the supply of fuel to burner 26 is reduced sufficiently by the thermostatic control in the manner just explained, no lifting of liquid by vapor lift action will take place in the vapor lift pump 22 under these conditions, and the circulation of absorption solution through and between the generator 23 and the absorber 16 will stop. Hence, when the thermostatic control provided acts to reduce the supply of fuel to burner 26 and refrigerant vapor is no longer expelled from solution in the generator 23 and pump 22 is no longer effective to raise liquid to cause normal circulation of absorption solution, the supply of heat to the generator 23 for the purpose of producing useful refrigeration is interrupted and essentially cut off for all practical purposes.

In Fig. 2 is illustrated another manner of supplying heat to the generator 23 by an electrical heating element 34 disposed within the lower part of heating tube 24. In this instance, the control device 32 forming part of the expansible fluid thermostat is operatively associated with a switch 35 connected in one of the conductors 36 for supplying electrical energy to heating element 34. The control arrangement of Fig. 2 is of the "on" and "off" type in which the thermal bulb 30 becomes effective to cause control device 32 to close switch 35 and energize heating element 34 when the temperature of cooling unit 10 increases due to increase in load. Conversely, when the cooling unit 10 reaches a predetermined low temperature, the thermal bulb 30 becomes effective to cause control device 32 to open switch 35 and disconnect heating element 34 from the source of supply of electrical energy. In Fig. 2 switches 37 and 37' are associated with the thermostatically controlled switch 35 for controlling the supply of electrical energy to the heating element 34.

In accordance with our invention, the refrigeration system of Fig. 1 embodies provisions for adjusting the concentration of refrigerant in the absorption liquid circuit by accumulating and storing liquid refrigerant with variations in operating conditions, and for subsequently introducing such stored liquid refrigerant into the absorption liquid circuit in a controlled manner. In Fig. 1 this is accomplished by providing the conduit section 19 within the vessel 15 to form liquid holding spaces adjacent to one another. The conduit section 19 functions as a relatively small absorber vessel, the enlarged upper open end 40 of which forms a liquid inlet to receive absorption liquid from the lower end of the absorber coil 16. The conduit section 19, through which flow of liquid is effected from coil 16 to conduit 20, forms an active portion of the absorption liquid circuit in which the liquid normally circulates during operation of the refrigeration system. During such normal circulation of the absorption liquid, a body of liquid is maintained in the conduit section or absorber vessel 19 having a liquid surface 41 which is below the upper inlet end 40.

The vessel 15 functions as an accumulation or concentration vessel in which is stored unevaporated refrigerant passing from the cooling unit or evaporator 10. Such excess or unevaporated refrigerant passes from the lower end of cooling unit 10 and flows along the bottom part of the gas heat exchanger 12 and conduit 14 into the vessel 15, the unevaporated refrigerant entering the vessel 15 through conduit 14 with inert gas enriched in refrigerant. The lower part of conduit section 19 is formed with several openings 42, and a hollow member 43, which is disposed about such conduit section, is secured thereto below the openings 42 to provide a narrow passage 44 having an open end 45 at a region closely adjacent to and below the liquid surface 46 in the vessel 15. In this way, a region below the liquid surface level 41 of the liquid body in the conduit section 19 is in free liquid communication with a region below the liquid surface 46 of the liquid body in vessel 15, the connecting passage provided by the hollow member 43 and openings 42 in conduit section 19 being completely filled with liquid under all operating conditions of the system. Free liquid communication is established in such manner between the liquid bodies in the conduit section 19 and vessel 15 that the vessel 15 constitutes a part which is disposed outside the active portion of the absorption liquid circuit and in which normal flow of absorption liquid is absent.

In view of the foregoing, it will now be understood that a body of absorption liquid is held in the conduit section 19, and that absorption liquid passes through the openings 42 and passage 44 into the vessel 15. Under certain operating conditions, unevaporated refrigerant also passes from the cooling unit 10 into the vessel 15 and accumulates therein. The inert gas enriched in refrigerant and flowing from the cooling unit 10 through the conduit 14 passes through the vapor space of vessel 15. From vessel 15, inert gas enriched in refrigerant flows upwardly through absorber coil 16 in counterflow to the absorption liquid flowing downwardly therein.

Since the upper open end 40 of the conduit section 19 is positioned so that it will always be at a higher level than the liquid surface 46 in the vessel 15, the unevaporated liquid refrigerant accumulated therein essentially will be withdrawn from the absorption liquid circuit. Such refrigerant will be absorbed into absorption liquid held in vessel 15 and increase the concentration of refrigerant in such absorption liquid to a value materially greater than the concentration of refrigerant in the absorption liquid in the conduit section 19 from which absorption liquid flows through conduit 20.

In Fig. 1, stored liquid refrigerant in the vessel 15 is positively introduced into the active portion 19 of the absorption liquid circuit in a controlled manner by redistributing the absorption liquid in its circuit and increasing the quantity of such liquid held in the vessel 15. The quantity of liquid held in vessel 15 is increased when the heat supply to the generator 23 is reduced sufficiently to render the vapor lift pump 22 inactive, thereby terminating the raising of absorption liquid to the level I in Fig. 1. Under these conditions, normal circulation of liquid in the absorption liquid circuit stops and the quantity of liquid held in boiler pipe 25 between the levels I and II flows therefrom through liquid heat exchanger 21 and conduit 17 into the upper end of the absorber coil 16. When the pump 22 becomes inactive, some liquid is, therefore, transferred from boiler 25 to absorber coil 16 and passes to conduit section 19, from which liquid flows through the openings 42 and passage 44 into vessel 15 and collects therein. Also, liquid contained in the absorber coil 16 and wetting the inner wall surfaces thereof will flow downwardly therefrom into the conduit section 19, thereby causing additional liquid to flow from such conduit section into the vessel 15.

When ammonia and water are employed as the refrigerant and absorption liquid respectively, and unevaporated ammonia passes from the cooling unit 10 and accumulates in vessel 15 and forms a part of the liquid body therein, the liquid surface level in vessel 15 will be slightly higher than that in conduit section 19 depending upon the increase in concentration of ammonia in the absorption liquid in vessel 15. This is so because, as unevaporated ammonia collects in vessel 15, the specific gravity of the absorption liquid in that vessel decreases, and a liquid body of slightly greater height is required in vessel 15 to balance the body of absorption liquid of less height in the conduit section 19. When unevaporated ammonia has accumulated in vessel 15, and absorption liquid held in other parts of the system is transferred to the conduit section 19, a quantity of absorption liquid flows from the latter to vessel 15 which is substantially the same as that transferred to the conduit section 19.

Let us assume that an air-cooled refrigeration system generally like that shown in Fig. 1 and described above is charged with ammonia, hydrogen and water, so that the system will operate in a satisfactory manner in a normal temperature range of about 70° F. When the circulation pump 22 in the absorption liquid circuit is in operation, an equilibrium condition is established in which absorption liquid flows at a certain rate into the conduit section 19 and is withdrawn therefrom to the generator 23 at essentially the same rate, and the liquid surface levels in the conduit section 19 and vessel 15 are practically constant. Under these conditions, the liquid column in conduit section 19 balances the liquid column in vessel 15 and passage 44, the gas pressures acting on the liquid surfaces of the liquid bodies in conduit section 19 and vessel 15 being the same.

Active circulation of absorption liquid only takes place through conduit section 19 during normal operation, and the passage 44 and vessel 15 essentially constitute a dead-end appendage for absorption liquid in which the liquid body is more or less stagnant. In such normal operation of the system, the thermostatic control will be operable to shut off the heat supply to the generator 23 when the cooling unit 10 reaches a predetermined low temperature, and substantially all of the liquid refrigerant will be evaporated therein and possibly also in the gas heat exchanger 12. Also, the conduit section 19 of the absorption liquid circuit will function in the normal manner explained above. When there is a slight change in the liquid level in vessel 15 during normal operation of the system, there is a corresponding change in the liquid level in conduit section 19, because the liquid columns of these liquid bodies balance one another.

Let us now assume that the ambient air temperature increases to about 110° F., so that the heat of absorption produced in the absorber coil 16 under the new operating conditions is not effectively given up to the ambient air flowing in thermal relation therewith. Under such conditions, refrigerant vapor is not effectively absorbed into absorption liquid in the absorber coil 16, and inert gas will flow to cooling unit 10 having an abnormally high concentration of refrigerant vapor, so that the cooling unit 10 will not be capable of producing the desired low refrigerating temperature for which the thermostatic control is adjusted. Under these assumed conditions, the thermostatic control will function to continue the heat supply to the generator 23. By reason of the abnormally high partial pressure of refrigerant vapor in the inert gas introduced into the cooling unit 10, all of the liquid refrigerant supplied to the cooling unit will not be evaporated therein, and the excess unevaporated refrigerant passing from the cooling unit 10 will flow to the vessel 15 in which it is accumulated and stored.

By storing unevaporated liquid refrigerant in vessel 15, such refrigerant in effect is withheld or withdrawn from the absorption liquid circuit; and the concentration of refrigerant in the absorption liquid eventually will be reduced adequately, so that absorption liquid having a sufficiently low concentration of refrigerant will be supplied to absorber coil 16 from generator 23. This will enable the absorber to function properly even at the higher ambient air temperature, thereby enabling the absorber to supply inert gas to cooling unit 10 which is sufficiently poor in refrigerant vapor to cause substantially all of the liquid refrigerant to evaporate in the cooling unit 10 and gas heat exchanger 12.

When the ambient air temperature decreases from the high value assumed above and begins to approach the normal temperature range, it is highly desirable to increase the concentration of refrigerant in the absorption liquid as soon as possible. This is so because, in the lower or normal temperature range, such increase in concentration of refrigerant in the absorption liquid makes it possible to operate the generator 23 at a lower temperature, which means that the radiation losses will be reduced, the generator can be operated with less heat input, and the rectification losses will be decreased.

Such decrease in ambient air temperature to the normal temperature range may occur during the nighttime, for example, which in turn reduces the load on the refrigeration system. Under these conditions, the temperature of cooling unit 10 also will decrease; and, when the latter reaches the predetermined low temperature referred to above, the thermostatic control will be operable to shut off the heat supply to the generator 23. As explained above, this will interrupt the normal circulation of absorption liquid and cause liquid to be transferred to the conduit section 19 from other parts of the system. By reason of the free liquid communication between the conduit section 19 and the vessel 15 which is always completely filled with liquid, absorption liquid flows from conduit section 19 through the openings 42 therein and passage 44 into vessel 15, when absorption liquid is transferred to the conduit section 19.

After an interval of time, the temperature of evaporator 10 will rise sufficiently to cause the thermostatic control to function and start the heat supply to the generator 23, at which time pump 22 becomes active. Liquid will now be withdrawn from vessel 15 by the pump 22, although it should be understood that normal circulation of absorption liquid in this vessel usually is absent. After the pump 22 starts raising liquid into the upper end of boiler pipe 25, an interval of time will pass before absorption liquid again flows into the conduit section 19. Hence, the entire quantity of liquid held in the vessel 15 will be reduced to an extent corresponding to the accumulation of liquid in the vessel 15 when the normal circulation of absorption liquid is reduced and liquid in the absorption liquid circuit is transferred to the conduit section 19.

When the new pumping period commences, the part of boiler pipe 25 between the levels I and II is depleted of liquid; and the absorber coil 16 can accumulate a comparatively large amount of liquid at the inner wall surfaces thereof, due to the action of capillary and adhesive forces, before a stream of liquid passes through the entire length of the absorber coil. In view of the manner in which normal circulation of absorption liquid is resumed, a certain amount of absorption liquid relatively rich in refrigerant will pass from the upper part of vessel 15 into the active portion of the absorption liquid circuit when pumping is started following a shutdown period. When absorption liquid again flows into conduit section 19 from coil 16 and an equilibrium condition is established, the liquid levels in the conduit section 19 and the vessel 15 will be essentially the same due to the free liquid communication therebetween and the same gaseous atmosphere enveloping the liquid bodies in both vessels.

In view of the foregoing, it will now be understood that, when the vapor lift pump 22 is operating and normal circulation of absorption liquid is being effected, absorption liquid is constantly flowing from the absorber coil 16 into the upper end of the conduit section 19, and liquid is constantly being withdrawn from such conduit section and conduit 20 by the vapor lift pump 22. When the heat supply to the generator 23 is stopped or reduced, as by the thermostatic controls shown in Figs. 1 or 2, to render pump 22 entirely or practically inactive, the flow of absorption liquid through the conduit section 19 will immediately stop.

When this occurs, a quantity of absorption liquid will be transferred to the conduit section 19 from other parts of the system in the manner explained above. Since there is no flow of liquid from the conduit section 19 when the normal circulation of absorption liquid has been interrupted, a quantity of liquid, nearly equal to and essentially the same as that transferred to conduit section 19, flows through the openings 42 and passage 44 to the vessel 15 practically immediately upon the transferred or redistributed liquid reaching the conduit section 19.

This will cause the liquid surface to rise in vessel 15 and in turn cause the liquid surface to rise in the conduit section 19. However, since the cross-sectional area of the conduit section 19 is relatively small compared to that of the vessel 15, the quantity of liquid that flows from the conduit section 19 to the vessel 15 will be nearly equal to and essentially the same as that transferred to the conduit section 19 when the normal circulation of absorption liquid is interrupted.

When the pump 22 again becomes operable to circulate absorption liquid in its circuit, an interval of time passes before absorption liquid flows from the absorber coil 16 into the upper open end of the conduit section 19, as explained above. Accordingly, the liquid initially supplied to the inlet of the pump 22 flows thereto from the vessel 15 and conduit section 19. Since the quantity of liquid held in the conduit section 19 is relatively small compared to the quantity held in the vessel 15, practically all of the liquid supplied to the pump 22, when operation thereof is started, comes from the vessel 15. Further, since liquid from the top part of vessel 15 flows into the upper open end 45 of the passage 44 when liquid is being withdrawn from the vessel under these conditions, the liquid initially supplied to the pump 22, when operation thereof is started, is relatively rich in refrigerant. This is so because the liquid in the upper layer or stratum in the vessel 15 has a relatively high concentration of refrigerant.

By providing the conduit section 19 at the vicinity of the concentration vessel 15, the quantity of absorption liquid in the active or normal circulation circuit of the absorption liquid is only sufficient to maintain the requisite liquid circulation. Accordingly, the size of the liquid passage formed by the conduit section 19 is essentially the same as the sizes of the absorption liquid passages provided by the absorber coil 16 and conduit 20 through which absorption liquid flows respectively to and from the conduit section 19. Hence, very little absorption liquid is supplied from conduit section 19 to the pump 22 when the latter becomes operable following a shut-down period, and a quantity of absorption liquid having a relatively high concentration of refrigerant passes into the absorption liquid circuit from the vessel 15. In this way, the full impact of the relatively rich absorption liquid supplied from the vessel 15 is quickly felt to increase the concentration of refrigerant in the absorption liquid circuit.

In Fig. 4, we have shown another embodiment of our invention, in which the vessel 15a is provided with a partition 47 to provide adjacent chambers 48 and 49. The chamber 48 is connected in the normal circulation circuit for the absorption liquid and provides a storage space into which absorption liquid flows from the lower end of the absorber coil 16. The conduit section 19a extends upwardly within the chamber 48, and absorption liquid in the latter overflows into the upper open end 40a of the conduit section for flow through conduit 20 to the generator 23, in the same manner described above in the embodiment of Fig. 1.

Inert gas enriched in refrigerant flows from cooling unit 10 through conduit 14 into the chamber 49, and, after passing through an opening 50 in the partition 47 into the chamber 48, enters the lower end of the absorber coil 16. The chamber 49 serves as a concentration vessel into which excess liquid refrigerant flows through conduit 14 from the cooling unit 10. Further, absorption liquid will also pass into the chamber 49 from the lower part of conduit section 19a through a branch connection or conduit 44a having the upper open end 45a thereof terminating at a level beneath and closely adjacent to the liquid surface 46a in the chamber or space 49.

The opening 50 in partition 47 is positioned so that, during operation of the refrigeration system, liquid in the vessel 15a can never pass through such opening. The upper end of conduit section 19a is at a level slightly below the opening 50 in partition 47, and its position determines the quantity of absorption liquid that can be stored in chamber 48. Liquid overflows from chamber 48 into the conduit section 19a to maintain a body of liquid in the latter, the surface level 41a of which is below the overflow point at the extreme upper end of the conduit section.

In view of the foregoing, it will now be evident that the embodiment of Fig. 4 is generally like the embodiment of Figs. 1 and 3, and differs therefrom in that the lower end of the absorber coil 16 does not need to be positioned directly over the upper open end 40a of the conduit section 19a. For this reason, the chamber 48 is provided in which is stored absorption liquid passing from the lower end of the absorber coil 16. When normal circulation of absorption liquid is being effected, liquid overflows into the upper end of conduit section 19a and passes therethrough at the same rate at which liquid passes from the lower end of the absorber coil 16. Since the modification of Fig. 4 in other respects operates and functions in the same way as the embodiment of Figs. 1 and 3, which has been described above, it is believed that the operation of the modification will be evident without the need for repeating the operation of the first described embodiment, which is also applicable to the embodiment of Fig. 4.

However, it is desired to point out that, when the normal circulation of absorption liquid stops in the embodiment of Fig. 4, and liquid is transferred to conduit section 19a from other parts of the system, the liquid surface 41a in conduit section 19a will be at a level below the extreme upper end 40a thereof after flow of liquid from conduit section 19a to chamber 49 has been completed. Hence, when the normal circulation of absorption liquid is resumed, only a relatively small quantity of liquid will be supplied to the pump from the conduit section 19a, while practically the entire quantity of liquid initially supplied to the pump will come from the concentration vessel 49, as in the embodiment of Figs. 1 and 3.

It has been stated above that the conduit sections 19 and 19a in Figs. 3 and 4 function as relatively small absorber vessels and are essentially the same in size as the absorption liquid passages provided by the absorber coil 16 and conduit 20 through which absorption liquid normally flows to and from the conduit sections 19 and 19a. Accordingly, in the preferred embodiments illustrated and described above, the quantity of liquid that can be held in the part of vessel 15 disposed about conduit section 19 in Fig. 3 and in space 49 in Fig. 4 is more than four times greater than the quantity of liquid that can be held in the conduit sections 19 and 19a, respectively, which are in liquid communication therewith. As pointed out above, the relative sizes of the conduit sections 19 and 19a and the spaces in vessels 15 and 15a in communication therewith are such that when the circulation of absorption liquid in the absorption liquid circuit is modified or interrupted and the quantity of liquid transferred to conduit sections 19 and 19a flows from the lower ends thereof to the adjacent space in vessel 15 in Fig. 3 and space 49 in Fig. 4, the quantity of liquid remaining in the conduit sections 19 and 19a under all operating conditions encountered is essentially the same as the quantity of liquid held therein before the transferred liquid flows therefrom.

Further, the liquid passage 44 in Fig. 3 and conduit 44a in Fig. 4 extend upwardly in the vessels 15 and 15a, respectively, to a level which is beneath and closely adjacent to the liquid surfaces in the spaces into which liquid refrigerant flows through conduit 14. When water and ammonia are employed as the absorption liquid and refrigerant, respectively, and the circulation of the absorption liquid in its circuit is modified to cause transferred liquid to flow from conduit 19 into the adjacent space in vessel 15 in Fig. 3 and from conduit 19a into space 49 in Fig. 4, the absorption liquid entering these spaces tends to displace and raise the liquid in the upper layer or stratum in the space about conduit section 19 in Fig. 3 and in the space 49 in Fig. 4. This is so because the liquid in the upper layer or stratum of these spaces has a relatively high concentration of refrigerant. It is this liquid which is at the upper part of the liquid bodies in the space enveloping conduit section 19 in Fig. 3 and in space 49 in Fig. 4 that is initially supplied to the pump 22 when operation thereof is subsequently started when normal circulation of absorption liquid is resumed. In this way, the full impact of the relatively rich absorption liquid supplied from vessel 15 in Fig. 3 and space 49 in in Fig. 4 is quickly felt to increase the concentration of refrigerant in the absorption liquid circuit. This is so because only a relatively small quantity of liquid will be supplied to the pump from the conduit sections 19 and 19a in Figs. 3 and 4, while practically the entire quantity of liquid, which is relatively rich in refrigerant, will come from the spaces in vessels 15 and 15a which serve as concentration vessels.

It is desired to point out that subject matter common to the instant application and to Kogel application Serial No. 355,289, filed May 15, 1953 (now Patent No. 2,795,940, granted June 18, 1957), and not being claimed herein, is being claimed in the aforementioned Kogel application.

While several embodiments of the invention have been shown and described, it will be apparent to those skilled in the art that various modifications and changes may be made without departing from the spirit and scope of the invention, as pointed out in the following claims.

What is claimed is:

1. In the art of refrigeration with the aid of a system in which refrigerant vapor is expelled from absorption liquid in a generator, refrigerant vapor is liquefied, liquid refrigerant evaporates in the presence of an inert gas in an evaporator, refrigerant vapor is absorbed into absorption liquid in an absorber, inert gas is circulated between the evaporator and absorber and absorption liquid is circulated through and between the generator and absorber, the improvement which comprises the steps of maintaining in the path of circulation of absorption liquid a body of such liquid having a liquid surface at a first place in communication with the circulating inert gas, flowing liquid refrigerant in the system to a second place which serves as a place of accumulation for such liquid, a region of the body of liquid in the second place, which is below its liquid surface and in a part of such body where liquid enriched in refrigerant tends to stratify and collect, and a region of the body of absorption liquid at the first place which is below its liquid surface being in communication with one another in a path of flow which is always completely filled with liquid, intermittently transferring to the first place in the path of circulation of absorption liquid a quantity of such liquid during periods when the normal circulation of absorption liquid is modified, flowing to said part of the second place from the first place through said path of flow therebetween the quantity of liquid transferred to the first place and effecting such flow practically immediately upon the transferred liquid reaching the first place, the quantity of liquid that can be held in the second place being more than four times greater than the quantity of liquid that can be held in the first place with the relative sizes thereof being such that, after flowing the quantity of transferred liquid from the first place to said part of the second place, the quantity of liquid remaining in the first place is essentially the same as the quantity of liquid held therein before said flow of transferred liquid is effected from the first to the second place, and flowing absorption liquid enriched in refrigerant from said part of the second place into the path of circulation of absorption liquid when normal circulation of such liquid again commences.

2. In the art of refrigeration with the aid of a system in which refrigerant vapor is expelled from absorption liquid in a generator, refrigerant vapor is liquefied, liquid refrigerant evaporates in the presence of an inert gas in an evaporator, refrigerant vapor is absorbed into absorption liquid in an absorber, inert gas is circulated between the evaporator and absorber and absorption liquid is circulated through and between the generator and absorber, the improvement which comprises the steps of maintaining in the path of circulation of absorption liquid a body of such liquid having a liquid surface at a first place in communication with the circulating inert gas, flowing liquid refrigerant in the system to a second place which serves as a place of accumulation for such liquid, a region of the body of liquid in the second place, which is below its liquid surface and in a part of such body where liquid enriched in refrigerant tends to stratify and collect, and a region of the body of absorption liquid at the first place below its liquid surface being in communication with one another in a path of flow which is always completely filled with liquid, redistributing the absorption liquid in its path of circulation of absorption liquid to promote removal of liquid refrigerant from the second place to the path of circulation, such redistribution of the absorption liquid including the step of substantially terminating the normal circulation of absorption liquid in its path of circulation to transfer to the first place a quantity of absorption liquid, flowing to the second place from the first place through said path of flow therebetween the quantity of liquid transferred to the first place and effecting such flow practically immediately upon the transferred liquid reaching the first place while the normal circulation of the absorption liquid is substantially terminated, the quantity of liquid that can be held in the second place being more than four times greater than the quantity of liquid that can be held in the first place with the relative sizes thereof being such that, after flowing the quantity of transferred liquid from the first place to the said part of the second place, the quantity of liquid remaining in the first place is essentially the same as the quantity held therein before said flow of transferred liquid is effected from the first to the second place, and subsequently flowing absorption liquid enriched in refrigerant from said part of the second place into the path of circulation of absorption liquid when normal circulation of such liquid is resumed.

3. In the art of refrigeration employing a system in which heat is supplied to a generator having a vapor lift pump to expel refrigerant vapor from absorption liquid therein, refrigerant vapor is converted to liquid in an air-cooled condenser, liquid refrigerant evaporates in the presence of an inert gas in an evaporator, refrigerant vapor is absorbed into absorption liquid in an air-cooled absorber, inert gas is circulated between the evaporator and absorber and absorption liquid is circulated with the aid of the vapor lift pump through and between the generator and absorber, the improvement which comprises the steps of adjusting the concentration of refrigerant in the absorption liquid circuit with variations in operating conditions by withdrawing excess liquid refrigerant from the evaporator with variations in operating conditions which includes, for example, increase in ambient air temperature, storing such withdrawn liquid refrigerant at a first place, maintaining a body of liquid in the absorption liquid circuit at a second place in communication with the circulating inert gas, a region of the body of liquid in the first place, which is below its liquid surface and in a part of such body where liquid enriched in refrigerant tends to stratify and collect, and a region of the body of liquid in the second place which is below its liquid surface being in communication with one another in a path of flow which is always completely filled with liquid, supplying absorption liquid to said body of liquid at the second place at a greater rate than that at which absorption liquid leaves said body upon cessation of heat supply to the vapor lift pump to render the latter substantially inactive and thereby transfer an additional quantity of liquid to the liquid body at the second place, the quantity of liquid that can be held in the first place being more than four times greater than the quantity of liquid that can be held in the second place with the relative sizes thereof being such that, after the additional liquid transferred to said second place flows therefrom to said part of the first place through said path of flow therebetween, the quantity of liquid remaining in the second place is essentially the same as the quantity of liquid held therein before flow of transferred liquid is effected from the second to the first place, and, when heat is again supplied to the vapor lift pump to render the latter active, flowing to the vapor lift pump absorption liquid which initially passes thereto from said part of the first place, such absorption liquid flowing from said part said of said first place to the vapor lift pump being enriched in refrigerant.

4. In the art of refrigeration with the aid of a system in which refrigerant vapor is expelled from absorption liquid in a generator, refrigerant vapor is liquefied, liquid refrigerant evaporates in the presence of an inert gas in an evaporator, refrigerant vapor is absorbed into absorption liquid in an absorber, inert gas is circulated between the evaporator and absorber and absorption liquid is circulated through and between the generator and absorber, the specific weight of the liquid refrigerant being less than that of the absorption liquid, the improvement which comprises the steps of maintaining in the path of circulation of absorption liquid a body of such liquid having a liquid surface at a first place in communication with the circulating inert gas, flowing liquid refrigerant in the system to a second place which serves as a place of accumulation for such liquid, a region of the body of liquid in the second place, which is below its liquid surface and in the upper part of such body, and a region of the body of absorption liquid at the first place below its liquid surface being in liquid communication with one another in a path of flow which is always completely filled with liquid, intermittently transferring to the first place in the path of circulation of absorption liquid a quantity of such liquid during periods when the normal circulation of absorption liquid is modified, flowing to the upper part of the second place from the first place through said path of flow therebetween the quantity of liquid transferred to the first place and effecting such flow practically immediately upon the transferred liquid reaching the first place, the quantity of liquid that can be held in the second place being more than four times the quantity of liquid that can be held in the first place with the relative sizes thereof being such that, after flowing to the second place the quantity of liquid transferred to the first place, the quantity of liquid remaining in the first place is essentially the same as the quantity of liquid held therein before said flow of transferred liquid is effected from the first to the second place, and subsequently flowing absorption liquid enriched in refrigerant from the region and the upper part of the second place adjacent the liquid surface thereof into the path of circulation of absorption liquid when normal circulation of such liquid again commences.

5. An absorption refrigeration system comprising circuits for normal circulation of refrigerant and absorption liquid, the circuit for circulation of absorption liquid including conduit means providing a first space for holding a body of such liquid, structure providing a second space, the system including means for conducting liquid refrigerant to the second space for accumulation therein, the surface level of liquid in the second space always rising and falling responsive to rise and fall, respectively, of the surface level of the liquid in the first space by passage means which connects and is in communication with said conduit means and said means providing the second space and is completely filled with liquid under all operating conditions of the system, said passage means extending upward within the second space and being in communication with the upper part thereof where liquid enriched in refrigerant tends to stratify and collect, and means to promote removal of liquid refrigerant from said upper part of the second space into the absorption liquid circuit, said last-mentioned means including provisions for redistributing the absorption liquid in its circuit and effecting transfer of a quantity of absorption liquid to the first space in said conduit means, said conduit means and said passage means being formed by structure for flowing from the first space to said upper part of the second space through said passage means the quantity of absorption liquid transferred to the first space when absorption liquid is redistributed in its circuit, the quantity of liquid that can be held in the second space being more than four times greater than the quantity of liquid that can be held in the first space with the relative sizes thereof being such that, after flowing to the second space the quantity of liquid transferred to the first space, the quantity of liquid remaining in the first space is essentially the same as the quantity of liquid held therein before said flow of transferred liquid is effected from the first to the second space, and said absorption liquid circuit including means for withdrawing liquid from said upper part of the second space responsive to resumption of normal circulation of absorption liquid in its circuit.

6. An absorption refrigeration system comprising circuits for normal circulation of refrigerant and absorption liquid, the circuit for circulation of absorption liquid including an absorber and conduit means providing a first space for holding a body of such liquid, structure providing a second space, the system including means for conducting liquid refrigerant to the second space for accumulation therein, the surface level of liquid in the second space always rising and falling responsive to rise and fall, respectively, of the surface level of the liquid in the first space by passage means which connects and is in communication with said conduit means and said means providing the second space and is completely filled with liquid under all operating conditions of the system, said passage means extending upward within the second space and being in communication with the upper part thereof where liquid enriched in refrigerant tends to stratify and collect, and means to promote removal of liquid refrigerant from the second space into the absorption liquid circuit, said last-mentioned means including provisions for redistributing the absorption liquid in its circuit and effecting transfer of a quantity of absorption liquid to the first space in said conduit means responsive substantially to interruption of normal circulation of absorption liquid in its circuit, and said conduit means and said passage means being formed by structure for flowing from the first space to said upper part of the second space through said passage means the quantity of absorption liquid transferred to the first space when absorption liquid is redistributed in its circuit, the quantity of liquid that can be held in the second space being more than four times greater than the quantity of liquid that can be held in the first space with the relative sizes thereof being such that, after flowing to the second space the quantity of liquid transferred to the first space, the quantity of liquid remaining in the first space is essentially the same as the quantity of liquid held therein before said flow of transferred liquid is effected from the first to the second space, and said absorption liquid circuit including means for withdrawing liquid from said upper part of the second space responsive to resumption of normal circulation of absorption liquid in its circuit.

7. An absorption refrigeration system as set forth in claim 6 in which said conduit means providing the first space serves as an absorber vessel and into which absorption liquid flows from said absorber, and said means providing the second space forms an accumulation vessel for liquid refrigerant, said absorber vessel being disposed within said accumulation vessel and having an opening at the upper end to receive absorption liquid from said absorber, such opening being at a higher level than the liquid surface of the body of absorption liquid maintained in said absorber vessel.

8. An absorption refrigeration system as set forth in claim 6 in which said conduit means is apertured at a region removed from the upper open end thereof to provide said passage means between said conduit means and said accumulation vessel beneath the surface levels of the bodies of liquid therein.

9. An absorption refrigeration system as set forth in claim 8 which includes an elongated hollow member disposed about said conduit means to provide said passage means extending within the second space, the lower end of said member being secured to said conduit means below the apertured region thereof and the upper end thereof being in communication with the upper part of said accumulation vessel beneath the liquid surface thereof.

10. An absorption refrigeration system as set forth in claim 6 in which said means for withdrawing liquid from said upper part of the second space includes a pump, said absorption liquid circuit comprising a connection from said pump to said conduit means providing the first space for holding a body of absorption liquid, a storage vessel into which absorption liquid flows from said absorber, said conduit means being disposed within said storage vessel and having an upper open end into which liquid always overflows from said vessel during operation of the system, an accumulation vessel providing the second space, and a branch line extending to said accumulation vessel from a region of said conduit means removed from the upper open end thereof.

11. An absorption refrigeration system as set forth in claim 10 in which said branch line extends upwardly in said accumulation vessel and is formed with an opening communicating with the upper part of the liquid body therein and below the liquid surface of such body.

12. An absorption refrigeration system as set forth in claim 11 in which the liquid surface of the body of liquid in said accumulation vessel is at a lower level than the region at which liquid overflows from storage vessel into the upper end of said conduit means.

13. An absorption refrigeration system as set forth in claim 12 in which said storage and accumulation vessels are adapted to hold substantially the same quantity of liquid.

References Cited in the file of this patent

UNITED STATES PATENTS

| | | |
|---|---|---|
| 1,924,770 | Backstrom | Aug. 29, 1933 |
| 2,246,665 | Buffington | June 24, 1941 |
| 2,329,863 | Thomas | Sept. 21, 1943 |
| 2,465,904 | McNeely | Mar. 29, 1949 |
| 2,501,606 | Koger | Mar. 21, 1950 |

FOREIGN PATENTS

| | | |
|---|---|---|
| 1,055,113 | France | Oct. 14, 1953 |

UNITED STATES PATENT OFFICE

CERTIFICATE OF CORRECTION

Patent No. 2,842,943                                                              July 15, 1958

Wilhelm Georg Kogel et al.

It is hereby certified that error appears in the printed specification of the above numbered patent requiring correction and that the said Letters Patent should read as corrected below.

Column 7, line 39, for "soil" read -- coil --; column 11, line 67, for "communicatin" read -- communication --; column 12, line 19, strike out "said", second occurrence; column 14, line 53, after "from" insert --said--; same column 14, line 66, list of references cited, under the heading "UNITED STATES PATENTS", for "Koger" read -- Kogel --.

Signed and sealed this 23rd day of September 1958.

(SEAL)
Attest:

KARL H. AXLINE                                                   ROBERT C. WATSON

Attesting Officer                                              Commissioner of Patents